United States Patent [19]

Boksjö

[11] 4,292,005

[45] Sep. 29, 1981

[54] PIER CONSTRUCTION

[76] Inventor: Lennart Boksjö, Utsiktsvägen 2 A, 436 00 Askim, Sweden

[21] Appl. No.: 28,916

[22] Filed: Apr. 10, 1979

[30] Foreign Application Priority Data

Apr. 11, 1978 [SE] Sweden .............................. 7804019

[51] Int. Cl.³ .............................................. E02B 3/20
[52] U.S. Cl. ..................................... 405/219; 114/263
[58] Field of Search ............... 405/218, 219, 220, 221; 114/258, 263; 14/27

[56] References Cited

U.S. PATENT DOCUMENTS

| | | | |
|---|---|---|---|
| 2,389,353 | 11/1945 | Foss | 405/219 |
| 2,857,872 | 10/1958 | Usab | 405/219 X |
| 3,187,706 | 6/1965 | Ross | 405/218 X |
| 3,831,538 | 8/1974 | Meeusen | 405/219 X |

FOREIGN PATENT DOCUMENTS 1463794 11/1966 France .............................. 405/218

Primary Examiner—David H. Corbin
Attorney, Agent, or Firm—Haseltine and Lake

[57] ABSTRACT

In the pier mooring for a boat a rectangular inner section is provided which serves as the land connection. A first short side and an outer part of the pier mooring is affixed to a second outer short side of the inner part of the structure. The outer part is formed as a parallel trapezium with the non-parallel side forming an angle of between 70 to 120 degrees. The non-parallel sides are provided with extensions which have outer ends which employ locking structure to affix the boat to be moored therebetween by means of lines running from the outer ends to either end of the boat.

3 Claims, 3 Drawing Figures

PIER CONSTRUCTION

BACKGROUND OF INVENTION

The present invention relates to an improved construction of a landing-stage or pier for small boats or yachts.

Due to the ever increasing number of small boats and yachts there is a demand for improved landing or mooring stages or piers which are easy to raise or assemble and permits a simplified mooring. A pier for boats of the above-mentioned type usually consists of a plane leading from the land out into the water to the required depth. Boats are usually tied to such a pier with the use of a buoy in the water at a distance from the pier, the buoy being kept in position with an anchor, stone or similar object. The boat is tied between the buoy and the pier. One pier can accomodate a number of boats depending on its size. However, such moorings are relatively expensive, especially since the chain which customarily is used to connect the buoy with the anchor stone will be corroded by rust-formation and has a limited length of life, usually 3 - 5 years. Also, such construction tends to be destroyed by ice formed during the winter period

SUMMARY OF INVENTION

The present invention relates to an improved pier construction for mooring one or more small boats or yachts without any need for mooring buoys, anchor-stones or chains.

IN THE DRAWINGS

The invention is elucidated with reference to the enclosed drawings in which.

DESCRIPTION OF INVENTION

The drawings are diagrammatic and show the pier planes and the general arrangement viewed from above and boats moored to the pier. The mooring lines are indicated by dotted lines.

As mentioned above the basic specific form is shown in FIG. 1. Connection with land is via a relatively narrow rectangular part 1 of the pier plane, the outer part of which has the form of a parallel trapezium and the shorter parallel edge 3 of the same being the same as the width of pier part 1. The angle between the non-parallel edges of the parallel trapezium is in the range 70°–120°, preferably about 90°. Along the non-parallel edges extensions 5 and 6 are attached, the length of which depends on the size of the boat to be moored. For common sizes of boats the length is about equal to the length of the outermost pier edge. Means 7 and 8 for fastening of mooring lines are present at the outer ends of the extensions 5 and 6 and between the means a stiffly elastic line is attached, the middle point of which is adapted and intended for attachment to the fore end of the boat. The length of the line is such that the stem of the boat is prevented from touching the outer pier edge in which case damage can be caused on the boat.

From the outer ends of the extensions 5 and 6 lines are extended to the aft part of the moored boat and by proper adjustment of the lines, the position of the boat can be achieved without any risk of damage to the boat caused by wind or waves.

The inner part of the pier is fixed by conventional means to the land, whereas the outer part can be supported by conventional float elements and anchoring means or alternatively and preferably, the outer part is supported by poles 9 and 10 driven down in the sea-bed or bottom and fixed to the outer part of the piers.

Figure 1:
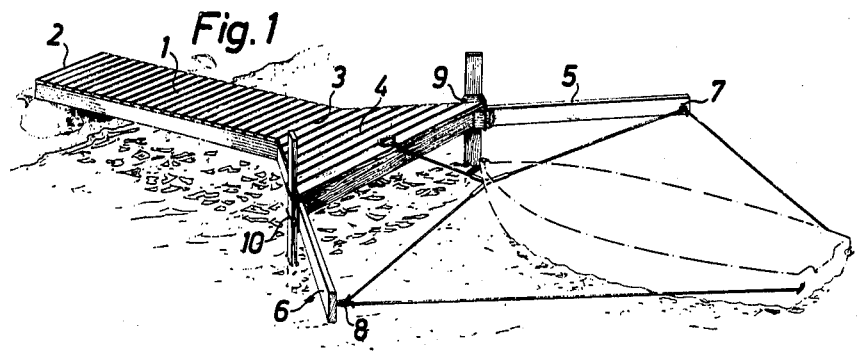
FIG. 1 shows the basic form of a pier according to the invention
Figure 2:
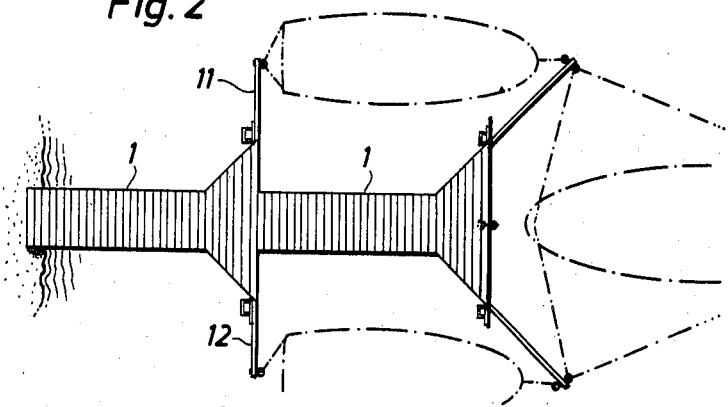
FIG. 2 shows a modification of the form shown in FIG. 1.

FIG. 2 shows a modification of the specific embodiment of FIG. 1 in which two pier elements have been placed in a row, one outside of the other. In this embodiment, the inner pier has a modified form, i.e. the extensions 5 and 6 in the form shown in FIG. 1 have been replaced by extensions 11 and 12 which run along the outermost edge of the pier and in the level of the pier plane. Outside of this inner pier a second pier is attached, the second pier having the same configuration as the one shown in FIG. 1. This embodiment admits mooring of three boats simultaneously, viz. one at the outer side of the outermost pier section as shown in FIG. 1 and also one boat on either side of the outermost pier section between the extensions 11 and 12 of the inner pier section and the extensions of the outer pier section.

Figure 3:
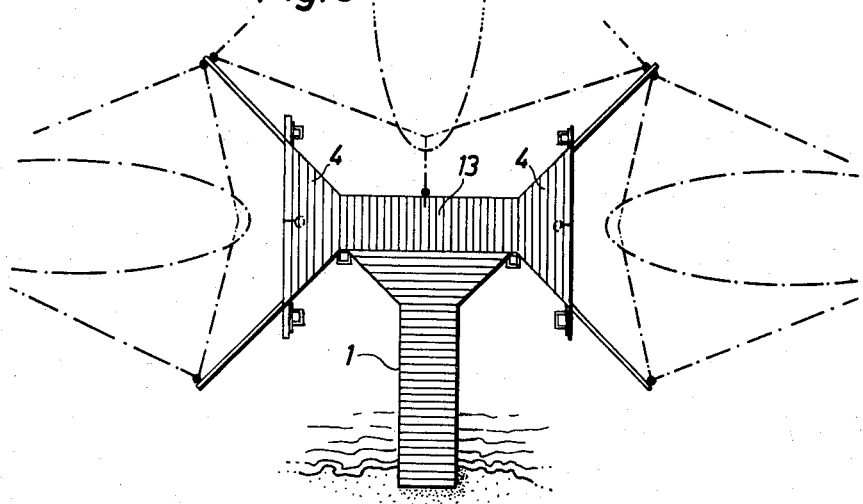
FIG. 3 shows a further modification.

FIG. 3 shows a further modified embodiment of the pier construction of the invention. In this embodiment, a pier section of the type shown in FIG. 1 is used but without the extensions 5 and 6. Along the outer edge of this inner pier section, a second pier section is attached, consisting of a narrow part 13 which extends along said outer edge and is attached thereto. The ends of this part 13 are prolonged with parallel trapezium parts 4 in similarity with the embodiment of FIG. 1. These parts 4 are thus also provided with extensions in similarity with the basic embodiment of FIG. 1. Three boats can be moored to a pier of this embodiment, viz. partly between the extensions in parts 4 in the outer pier section and partly between the outer extensions, viz. in the length direction of the pier.

It is obvious that further modifications by other combinations of the basic form shown in FIG. 1 are possible. Such modifications are encompassed within the scope of the invention.

I claim:

1. A pier for mooring of boats, formed of two sections, wherein: there is provided a rectangular inner section serving as a land-connection via a first short side and an outer section connected to said inner section at a second side oppositely disposed to said first short side of the inner section, said outer section being formed as a parallel trapezium which is supported by poles driven into a sea bed being affixed to said outer section; non-parallel sides of said outer section forming an angle of between 70°–120°; the non-parallel sides are formed with extensions, said extensions having respective ends provided with means for affixing a boat there at and partly for attachment of lines running from the ends to either end of the boat being affixed.

2. A pier according to claim 1, wherein: the means for affixing a stern of the boat between the outer ends of the extensions are relatively flexible.

3. A pier for mooring of boats, formed of two sections, wherein: there is provided a rectangular inner section serving as a land-connection via a first short side of an outer section connected to said inner section at a second side oppositely disposed to said first short side of the inner section, said outer section being formed as a parallel trapezium, said inner section is supported by solid land, and said outer section is supported by floats and anchor means, non-parallel sides of said outer section forming an angle of between 70°–120°; the non-parallel side are formed with extensions, said extensions having respective ends provided with means for affixing a boat there at and partly for attachment of lines running from the ends to either end of the boat being affixed.

* * * * *